(12) United States Patent
Hensley (10) Patent No.: US 6,993,649 B2
(45) Date of Patent: Jan. 31, 2006

(54) METHOD OF ALTERING A COMPUTER OPERATING SYSTEM TO BOOT AND RUN FROM PROTECTED MEDIA

(76) Inventor: John Alan Hensley, 12421 Hardee Rd., Raleigh, NC (US) 27614-9234

(*) Notice: Subject to any disclaimer, the term of this patent is extended or adjusted under 35 U.S.C. 154(b) by 397 days.

(21) Appl. No.: 10/321,772

(22) Filed: Dec. 17, 2002

(65) Prior Publication Data

US 2004/0117610 A1 Jun. 17, 2004

(51) Int. Cl.
*G06F 15/177* (2006.01)

(52) U.S. Cl. .............................. 713/2; 713/1
(58) Field of Classification Search .............. 713/1, 713/2, 100; 707/200, 204; 703/23, 24, 25
See application file for complete search history.

(56) References Cited

U.S. PATENT DOCUMENTS

| | | | |
|---|---|---|---|
| 5,193,184 A | 3/1993 | Belsan et al. |
| 5,418,918 A | 5/1995 | Vander Kamp et al. |
| 5,546,585 A | 8/1996 | Soga |
| 5,627,964 A | 5/1997 | Reynolds et al. |
| 5,652,868 A | 7/1997 | Williams |
| 5,752,005 A | 5/1998 | Jones |
| 5,787,466 A | 7/1998 | Berliner |
| 5,832,263 A | 11/1998 | Hansen et al. |
| 5,991,542 A | 11/1999 | Han et al. |
| 6,035,395 A | 3/2000 | Saito |
| 6,122,734 A | 9/2000 | Jeon |
| 6,170,055 B1 | 1/2001 | Meyer et al. |
| 6,173,417 B1 | 1/2001 | Merrill |
| 6,256,711 B1 | 7/2001 | Berliner |
| 6,263,378 B1 | 7/2001 | Rudoff et al. |
| 6,279,109 B1 | 8/2001 | Brundridge |
| 6,304,965 B1 | 10/2001 | Rickey |
| 6,317,845 B1 | 11/2001 | Meyer et al. |
| 6,334,149 B1 | 12/2001 | Davis, Jr. et al. |
| 6,356,915 B1 | 3/2002 | Chtchetkine et al. |
| 6,370,641 B1 | 4/2002 | Maia |
| 6,401,140 B1 | 6/2002 | Wu |
| 2003/0074550 A1 * | 4/2003 | Wilks et al. ............ 713/2 |

FOREIGN PATENT DOCUMENTS

WO   WO 97/44727   11/1997

OTHER PUBLICATIONS

Eric Schweickert, "Creating a Bootable CD–ROM with the El Torito Feature in Windows XP Embedded", Sep. 2002, Microsoft Corporation.*
"El Torito" Bootable CD–ROM Format Specification Version 1.0, Jan. 25, 1995; Curtis E. Stevens, Phoenix Technologies (20 pages).
Internet article entitled "Enhanced Write Filter"; Microsoft Windows XP Embedded; ms–help:// MS.MSDNQTR.2002JUL.1033/xpehelp/htm/xeconEnhancedWriteFilter.htm (10 pages).

* cited by examiner

Primary Examiner—Lynne H. Browne
Assistant Examiner—Paul Yanchus
(74) Attorney, Agent, or Firm—Coats & Bennett, P.L.L.C.

(57) ABSTRACT

A modern computer operating system is altered to boot and run from a protected medium such as a CD-ROM. Files and configuration information are copied from a fully configured and operational OS to a hard drive image file. File system filters and device drivers are added that implement an emulated read-write hard disk drive by servicing initial read requests from the image file, and write requests and read requests to previously written data, from a written disk sector database. The OS is altered to load the filters and drivers during boot, and to subsequently run from the emulated read-write hard disk drive. The hard drive image file is then placed on a bootable protected medium.

29 Claims, 9 Drawing Sheets

METHOD OF ALTERING A COMPUTER OPERATING SYSTEM TO BOOT AND RUN FROM PROTECTED MEDIA

BACKGROUND OF THE INVENTION

The present invention relates generally to the field of computers, and specifically to a method of altering an operating system to allow it to boot and run from protected media.

Modern personal computers have become complex, and may include a wide variety of peripheral devices and network interfaces. These devices may connect to the computer via a variety of standard interfaces, including the RS-232 Serial Port, Universal Serial Bus (USB), IEEE 1394 (also known as FireWire or i.Link), Small Computer System Interface (SCSI), and various network interfaces such as Token Ring, Ethernet, Bluetooth, IEEE 802.11, or the like. Most of these interfaces require a fully configured and running operating system to provide access to the attached device(s) and/or network(s). As such, data storage devices attached to the computer via these interfaces are a poor choice for use as backup devices for critical system files needed in the event of a computer crash, such as may be caused by a hard drive malfunction, virus infection or other problem that keeps the computer operating system (OS) from successfully running and providing access to the backup device.

Protected, or read-only, media devices, such as CD-ROM and DVD-ROM, have become ubiquitous parts of modern computer systems, with a CD-ROM and/or DVD-ROM drive standard equipment on the vast majority of computers. In addition, CD-ROM and DVD-ROM "burners," or drives capable of writing data to these traditionally read-only media, have proliferated to the extent that nearly all personal computer manufacturers offer a CD-ROM burner or DVD-ROM burner as standard equipment on the machines they sell. A cost effective means for a computer user to safely archive large quantities of computer programs and data is to use a CD-ROM or DVD-ROM burner and save the data onto Write Once Read Many (WORM) media, or alternatively, a "re-writable" media. In either case, after data has been burned onto the CD-ROM or DVD-ROM and the media session has been closed, the data is protected from any changes and will appear as a read-only disk to the computer's host OS and to the computer user.

While archiving data in a read-only format on protected media is cost effective, it imposes fundamental limitations on the way the archived data may be used. The standard file-system formats used on CD-ROM and DVD-ROM media were designed with characteristics specific to read-only media. For example, they limit direct use of data archived on the media to computer programs that were explicitly written to work with read-only files. As such, programs that rely on native file-system security features unable to directly use files archived on protected media. The read-only characteristics of protected media also preclude many executable programs from running directly from the media. For example, an executable program may need to write temporary files to the directory from which it was started, such as for scratch space, semaphores to synchronize with other programs or threads, alterations to the OS registry, or the like. As one consequence of the inability of many executable programs to run directly from protected media, most modern computer operating systems, which were designed to operate natively on a read-write storage device such as a hard drive, are unable to load and execute from a protected medium.

The inability of operating systems to run from protected media is a serious shortcoming in the field of disaster recovery—booting the computer following a failed or virus-infected primary drive to fix and/or disinfect the failed drive. This is particularly true for modern operating systems such as Microsoft Windows NT/2000/XP. In the early 1990s, the Microsoft Corporation introduced an advanced operating system called Windows NT. This new operating system, along with its new file system called NTFS, introduced the users of personal computers to a new paradigm whereby files that were created on the hard disk of the personal computer were no longer accessible by users of a legacy operating system such as MS-DOS and those versions of Microsoft Windows that were derived from MS-DOS, such as Windows 3x/9x/ME. Furthermore, Windows NT (and it successors) itself could not run from a protected media; thus simply copying the Windows NT operating system to a bootable medium as a disaster recovery option was only feasible when the recovery medium was a second hard drive.

The mid 1990s brought the adoption of the "El Torito" bootable CD-ROM specification, at the same time that CD-ROM burning hardware was becoming increasing available. The El Torito specification, published by Phoenix Technologies of Irvine Calif. and IBM of BocaRaton Fla., available at http://www.phoenix.com/resources/specs-cdrom.pdf and incorporated herein by reference, allows for one or more bootable hard or floppy disk "image" files on a CD-ROM, and concomitant alterations to the computer's ROMBIOS to support the CD-ROM as a bootable device. With the El Torito specification, it became feasible to create bootable disaster recovery CD-ROM disks using legacy operating system components, which (unlike the more modern OSs) could run from the protected media. Disaster recovery solutions thus could only be developed to run under legacy operating systems that could be booted from removable and read-only media.

Disaster recovery software developers continued to pressure Microsoft to provide a version of the non-legacy operating system that could run from protected media. In early 2002, Microsoft released Windows PE, a non-legacy operating system with limited functionality that is designed to boot and run from a CD-ROM disk. In addition to the limited functionality, Windows PE also comes with additional licensing fees for those who which to manufacture bootable CD-ROM disks containing the operating system. While Windows PE does provide a solution for disaster recovery on computer systems running a non-legacy operating system, it is deficient in several respects. Windows PE has limited functionality compared to the full non-legacy OS. It has limited hardware support, and is only offered for use on CD-ROM devices. Windows PE has limited support for running existing applications, and it does not provide writeable free disk space for running applications. Finally, a Windows PE disaster recovery CD-ROM will not contain user-specific configuration information.

Even with a limited operating system that can boot and run from protected media, the inability to write to free disk space is problematic. For example, following a severe virus infection, a user may wish to boot the computer from a disaster recovery disk, and access the Internet to download and execute a particular anti-virus program. This is impossible under an operating system that does not support writeable free disk space.

SUMMARY OF THE INVENTION

The present invention relates to a method of altering the operating system of a computer to boot and run from protected media. The method comprises creating a hard drive image file, and copying files and configuration information from a fully configured and operational operating system to the hard drive image file. The method further comprises copying a written disk sector database driver to the hard drive image file, where the written disk sector database driver is operative to create and maintain a written disk sector database of a predetermined maximum size. A read-only protection driver is additionally copied to the hard drive image file, where the read-only protection driver is operative to fail requests to write, delete, or change file access attributes of read-only files. A file access request redirection driver may also be copied to the hard drive image file, where the file access request redirection driver is operative to redirect write requests directed to read-write files or free space, and read requests directed to previously written files, to the written disk sector database. Files and configuration information on the hard drive image file are altered so that the operating system will load the written disk sector database driver, the read-only protection driver, and the file access request redirection driver during booting. The hard drive image file is then placed on a protected medium.

DETAILED DESCRIPTION OF THE INVENTION

The present invention relates to altering a modern computer operating system (OS) to boot and run from protected media. The altered OS boots and runs from a protected, or read-only, medium by emulating a read-write disk drive. As used herein, the term "protected media" refers to computer-readable data storage media that has or enforces read-only characteristics at the time of the hard disk emulation of the present invention. Traditional CD-ROM and DVD-ROM discs are examples of protected media, as are ROM, PROM, EEPROM, and similar read-only solid-state memories. The term also applies to CD-R and CD-RW media (as well as DVD+R, DVD+RW, and other optical storage media of any size, capacity, or format), which may be written one or more times, but at the close of such media session, have the characteristics of read-only media. Protected media also include magnetic storage media that have been rendered read-only, at the time of disk emulation according to the present invention, by the use of a "write protect" feature. The term is to be construed broadly.

Figure 1:
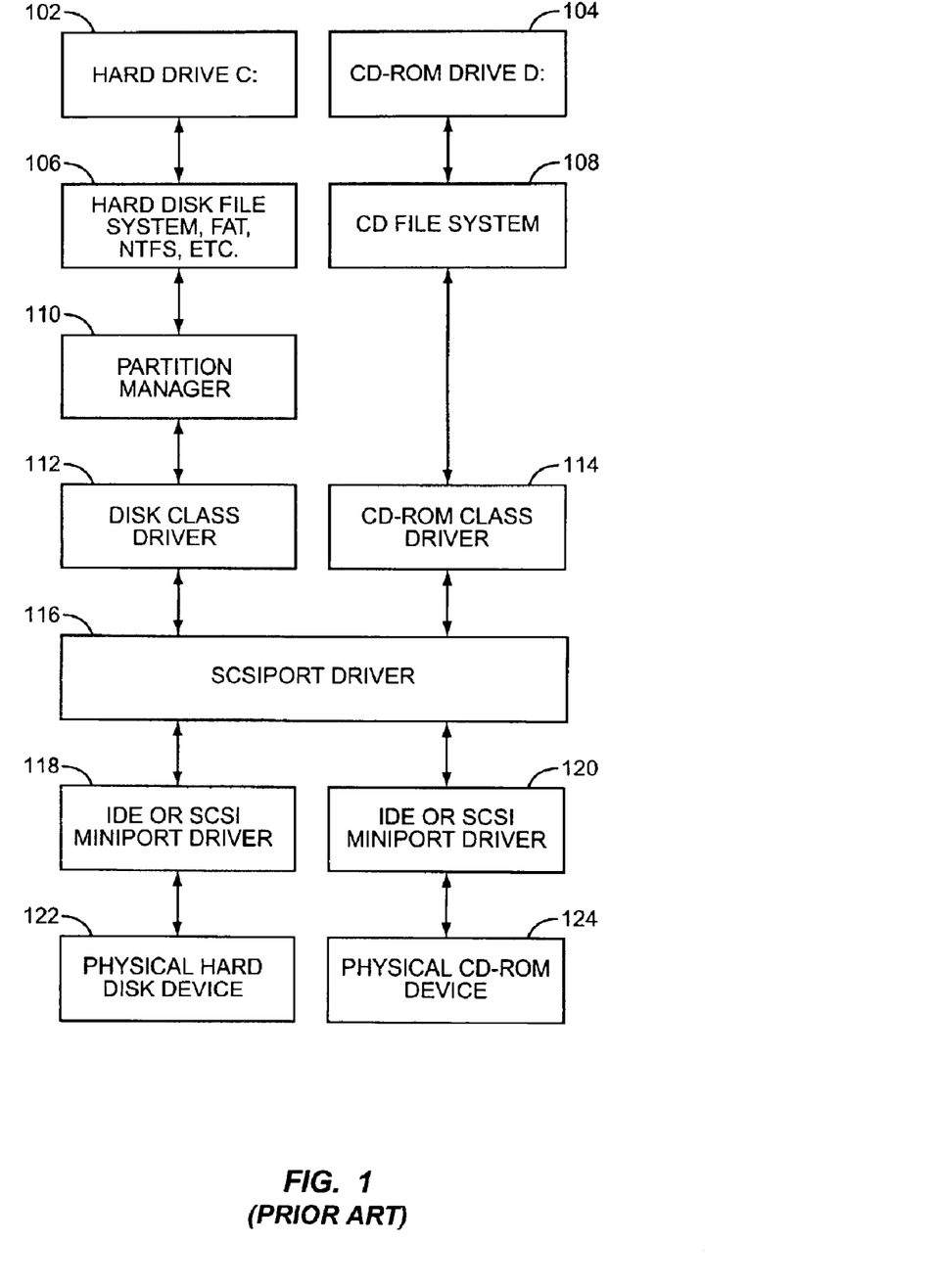
FIG. 1 is a diagram of prior art file system hierarchical filters and drivers.

Computer systems access data from, and store data to, a variety of data storage devices, or drives. Modern operating systems provide a layered hierarchy of support for, and access to, the storage devices, as depicted in FIG. 1. The various layers of device and file system drivers are typically loaded into memory and initialized during a system initialization, or boot, procedure. The layered approach allows the operating system, and other programs running within the operating system environment, to access files stored on the underlying storage media without specific knowledge of the underlying file system or hardware protocols. The use of a layered driver model in modern operating systems enhances the portability of programs, allows programs to execute on a wide range of hardware configurations, and allows for the incorporation of new storage technology into existing computers without the need to update all applications to take advantage of the new hardware. As discussed more fully herein, the layered driver model also makes it possible to change the apparent characteristics of a physical or virtual storage device, or of files located on a storage medium, by providing appropriate filters and drivers in the layer hierarchy.

As used herein, the term "file system filter" refers to filters, device drivers, or other software modules anywhere within the layered hierarchy as depicted in FIGS. 1, 2, 4, and 5. Note that some such filters at the lower levels, i.e., next to the hardware devices, may be independent of any specific file system, and may operate on a block I/O level. This allows the emulated read-write disk drive of the present invention to be implemented on a variety of systems, independent of the specific file system(s) the systems support. Such lower level filters are referred to herein as "file system filters" for consistency; the term is meant to be construed inclusively, and is not limited to filters operating within, or aware of, only certain specific file systems. Similarly, the programs that implement the file system filters, as well as the files that store such programs, are referred to as "file system filter drivers," regardless of the location within the layered hierarchy at which the associate file system filter actually operates.

FIG. 1 depicts a functional hierarchy of system components and device drivers that translate operating system views of storage devices (i.e., C: or D: drives) to the corresponding physical drive devices. The operating system provides standard interfaces to storage devices for use by application programs, such as the hard drive C: 102 and CD-ROM drive D: 104. Additional drive interfaces such as floppy drives, tape units, and the like are not shown; also, the use of a CD-ROM drive in this explanation is representative of a protected media drive, and is not limiting. The operating system standard drive interfaces 102, 104 allow programs running within the operating system environment to access files on the underlying media. The disk file system driver 106 and CD-ROM file system driver 108 provide services for accessing individual files within the respective file systems on the respective underlying media. The partition manager 110 provides access to data within each of a plurality of partitions that may exist on the hard disk. The disk class driver 112 and CD-ROM class driver 114 provide a means of accessing features that are specific to the underlying devices. The SCSIport driver 116 converts I/O requests into a standard format that is understood by the underlying miniport drivers 118 and 120. The miniport drivers 118, 120 understand the controllers on which the physical devices 122, 124 are attached, and process I/O requests from the SCSIport driver 116. Finally, the physical hard disk drive device 122 and CD-ROM drive device 124 read data from (and, in the case of the hard disk drive 122, store data to) non-volatile magnetic or optical data storage media, respectively.

Figure 2:
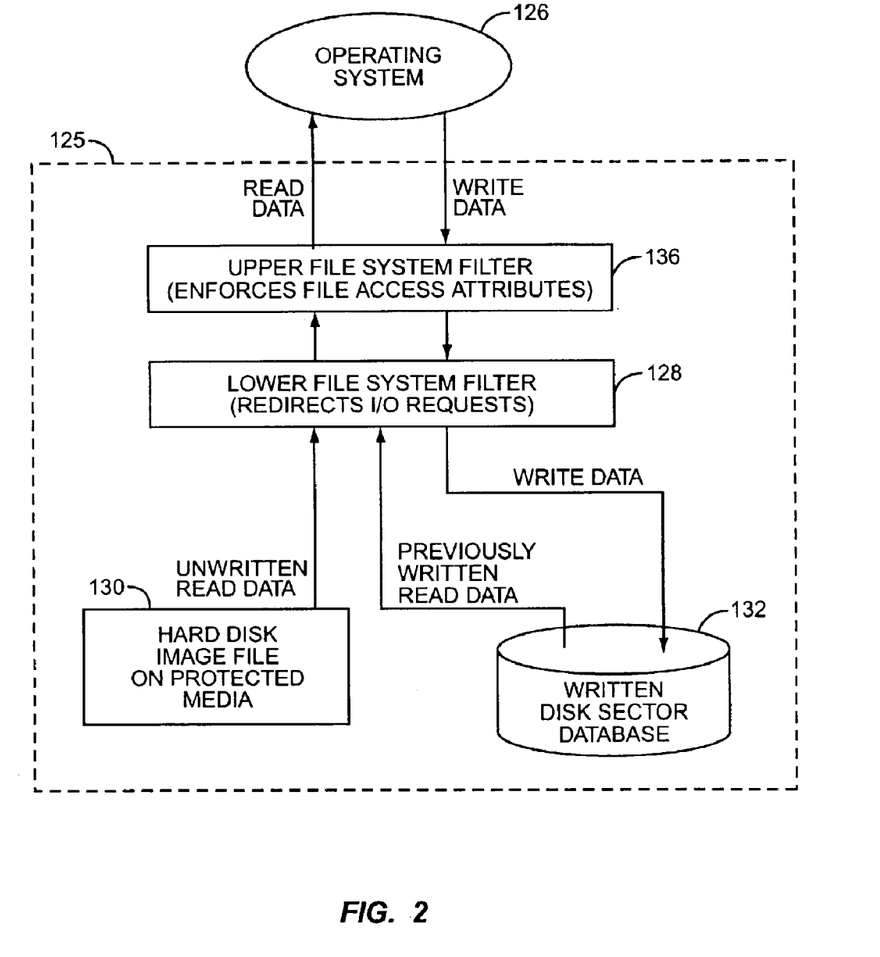
FIG. 2 is a functional block diagram of an emulated read-write hard disk drive.

FIG. 2 depicts, in functional block diagram form, an emulated read-write hard disk drive 125 on which file attributes are preserved. The emulated read-write hard disk drive 125 is described in detail in U.S. patent application Ser. No. 10/315,797 by the present inventor, which disclosure is incorporated by reference herein in its entirety. From the point of view of the altered operating system 126 according to the present invention, the emulated read-write disk drive 125 is indistinguishable from a physical hard disk drive (such as logical disk drive 102, implemented by physical hard disk drive 122 and the intervening layered file system and device drivers as depicted in FIG. 1). Both an upper file system filter 136 and a lower file system filter 128, as described in greater detail below, are inserted within the layered hierarchy of file system and device drivers (not shown) associated with the emulated read-write hard disk drive 125. The lower file system filter 128 intercepts read and write requests directed to the emulated drive 125. Initial read requests, that is, read requests directed to files or data not previously written, are serviced from a hard disk image file 130 residing on protected media, such as a CD-ROM. Write requests directed to the emulated hard disk drive 125 are intercepted by the lower file system filter 128, and directed to a written disk sector database 132. The written disk sector database 132 may reside in system memory or alternatively on any read-write storage device, and is capable of storing a quantity of write data corresponding to all read-write files and free space on the hard disk image file 130. The lower file system 128 services subsequent read requests, that is, read requests to files or data that have previously been written to the emulated hard disk drive 125, from the written disk sector database 132.

The upper file system filter 136 monitors and enforces access attributes associated with files and directories on the hard disk image file 130. For example, requests from the operating system 126 to change a read-only file attribute to read-write (which would allow the file to subsequently be deleted, giving the appearance of increasing the amount of free space available on the emulated hard disk drive 125) are intercepted and the operation prevented. In this manner, the total (ultimate) size of the written disk sector database 132 is constrained.

The written disk sector database 132 may be maintained on any available read-write computer data storage device, and is preferably maintained as a logical structure in system memory. The written disk sector database 132 may be organized in any logical structure as necessary or desired, but is preferably implemented as a succession of data storage locations, or "bins," each of a sufficient capacity to store one sector of the hard disk image file 130. Because the maximum size of the written disk sector database 132 is known or calculable (i.e., all read-write files and free space on the hard disk image file 130), the entire written disk sector database 132 may be allocated in advance (such as for example, during system initialization). Alternatively, the written disk sector database 132 may be dynamically constructed, with memory or other storage resources allocated only as data is written.

The written disk sector database 132 is similar in some respects to a disk cache. Disk caches are well known in the art. A disk cache improves perceived I/O performance, reducing the average latency of disk accesses by maintaining recently accessed data in a high-speed hierarchical memory level. Disk caches are populated with data in response to both read and write requests. Disk caches are typically of a fixed size, and when the available storage locations, or bins, are fully utilized, the older or less recently used bins are reallocated to store more recent data. When a reallocated bin contains write data, the underlying storage medium must be updated at some time to reflect the changed data that was written to the cache.

The written disk sector database 132 of the present invention differs from a disk cache in many important respects. The written disk sector database 132 is not populated with data in response to read requests. Rather, it contains only write data; that is, data associated with a write request directed to the emulated read-write hard disk drive 125 (read requests directed to previously written data are serviced from the written disk sector database 132, however, the database 132 is never populated with data in response to a read request). Since the ultimate size of the written disk sector database 132 is known, the storage locations or bins associated with a particular disk sector of the hard drive image file 130 are preferably not reallocated. That is, once a disk sector of a read-write file or free space on the hard disk image file 130 is written, the bin of the written disk sector database 132 allocated to that sector is not subsequently reallocated to another sector of the image file 130. Finally, the written disk sector database 132 does not maintain write data coherency with any underlying mass storage device. In other words, the written disk sector database 132 is the final destination of data written to the emulated read-write hard disk drive 125 of the present invention.

Figure 3:
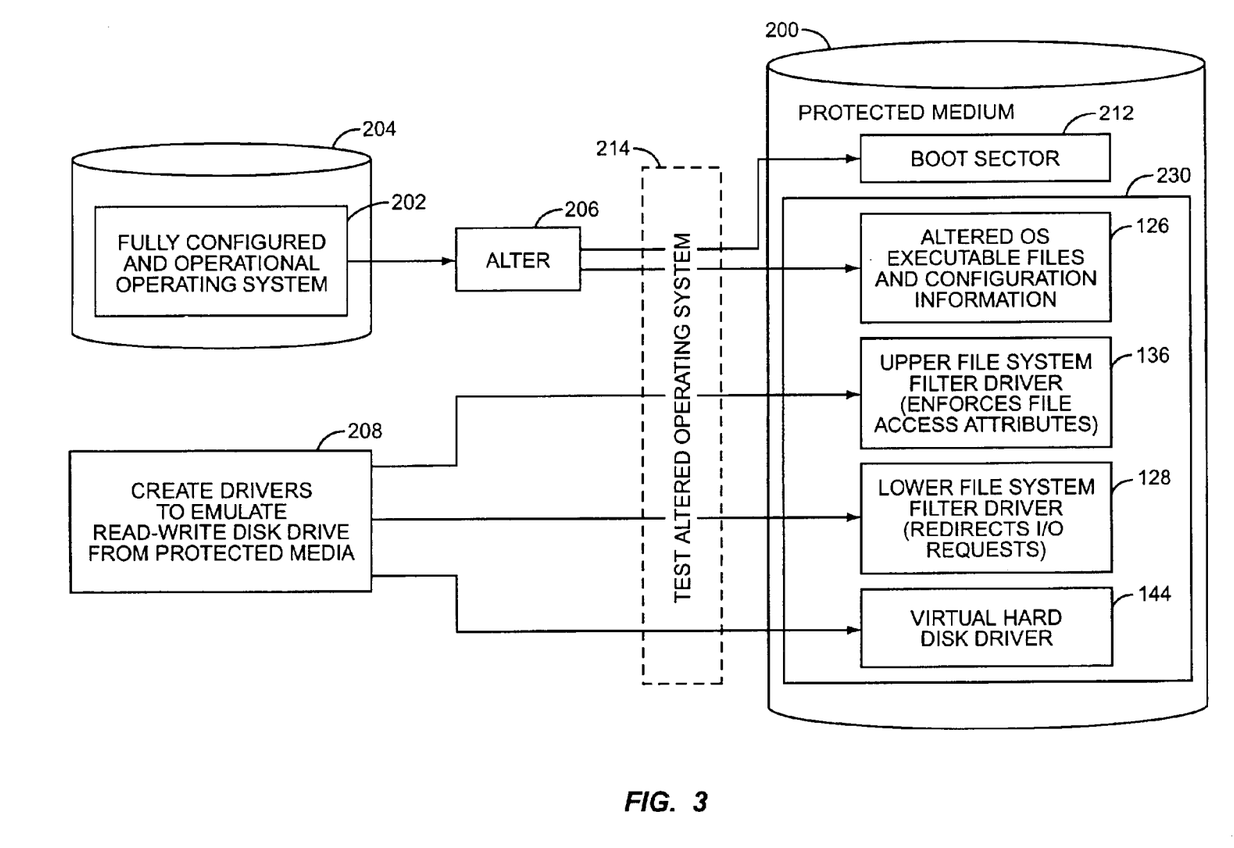
FIG. 3 is a functional diagram of one process of creating an altered operating system able to boot and run from protected media.

FIG. 3 depicts one manner in which a modern operating system may be altered to boot and run from a protected medium, according to the present invention. The method copies executable files and configuration information from a fully configured and operational modern OS 202, such as may reside on a hard disk drive 204 (such as for example the C: drive) of a personal computer, alters the files and information to reflect changes in logical storage location and other details (step 206), and places the altered OS files 126 in a hard disk image file 130 on the protected medium 200. An upper file system filter driver 136 for enforcing file access attributes and lower file system filter driver 128 for redirecting I/O requests, as described above, are created (step 208) and placed in the hard disk image file 130 on the protected medium 200. Additionally, at step 208, a virtual hard disk driver 144 is created and placed in the hard disk image file 130 on the protected medium 200. As described in greater detail below, the virtual hard disk driver 144 provides the I/O responses (via, in part, the written disk sector database 132) necessary to emulate a physical disk drive. Finally, a boot sector 212 is created at step 210, and placed on the protected medium 200. The boot sector 212 allows a computer whose ROMBIOS supports the El Torito specification to begin the boot process from the protected medium 200.

As will be discussed more fully below, the altered OS 126 and associated filters and drivers 136, 128, and 144 may be tested at step 214, prior to being placed on the protected medium 200. Such testing may, for example, comprise copying the altered OS 126 to one or more specific directories on hard drive 204, altering the boot information on the drive 204, rebooting the computer, testing the altered OS 126, restoring the computer's original boot information, and again re-booting using the fully configured and operational OS 202, prior to copying the files to the protected medium 200.

Figure 4:
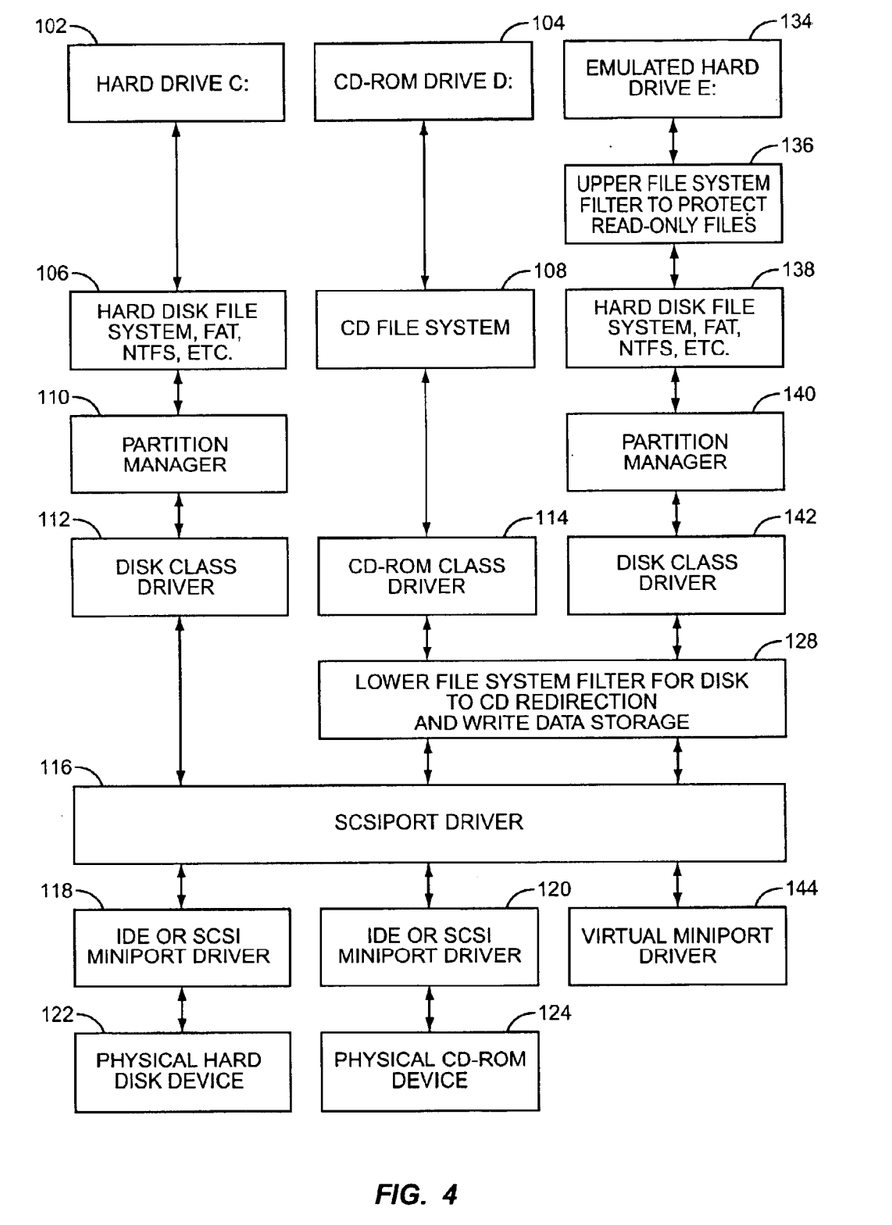
FIG. 4 is a diagram of a file system of a computer implementing one embodiment of an emulated read-write hard disk drive.

FIG. 4 depicts one implementation of the emulated read-write hard disk drive 125, within the layered hierarchy of file system drivers and devices previously described. In this embodiment, a virtual miniport driver 144 is added. The virtual miniport driver 144 emulates the basic functionality of a hard disk device by simulating sector read and write operations that are directed to it by the SCSIport driver 116. Also added to the file system hierarchy is the lower file system filter 128. The lower filter 128 intercepts file system requests directed to the virtual miniport driver 144 and provides read-write hard drive emulation. The lower filter 128 accomplishes this by redirecting write operations to the written disk sector database 132 as described previously. The lower filter 128 additionally redirects initial (i.e., not previously written) read requests to the CD-ROM drive, where the read data is retrieved from a hard drive image file 130 located on a protected medium.

Other file system components associated with the emulated read-write hard disk drive 125, such as the operating system interface 134, file system drivers 138, partition manager 140, and disk class driver 142 function in a manner directly analogous to those of a physical hard drive, as well known in the art, and as described above with reference to FIG. 1.

The emulated read-write hard disk drive 125 additionally includes an upper file system filter 136. The upper filter 136 enforces file system attributes on the emulated drive 125. That is, the upper file system 136 intercepts all read and write requests directed to the emulated read-write disk drive 125, and prevents changes to pre-existing read-only files on the emulated drive 125.

As seen with reference to FIG. 4, the logical structure and operational flow of data to and from the emulated read-write hard disk drive 125 are independent of those relating to a physical hard disk drive, such as drive 122. Thus, the altered OS 126 may boot and run completely from the emulated read-write hard disk drive 125 in a computer that lacks a physical hard disk drive 122, or for which an existing hard disk drive 122 is damaged or otherwise unavailable. The altered OS 126 of the present invention thus finds particular utility in disaster recovery, such as recovering from a physical hard disk drive crash, severe virus infection, or the like. Since the altered OS 126 is created from a fully configured and operational OS 202, it is "customized" to a particular computer, with its particular arrangement of hardware, accessories, network interfaces, subscription services, and the like. Additionally, since the altered OS 126 comprises merely "back-up" copies of the fully configured and operational OS 202, no separate license is required to utilize the altered OS 126 in lieu of the fully configured and operational OS 202.

Figure 5:
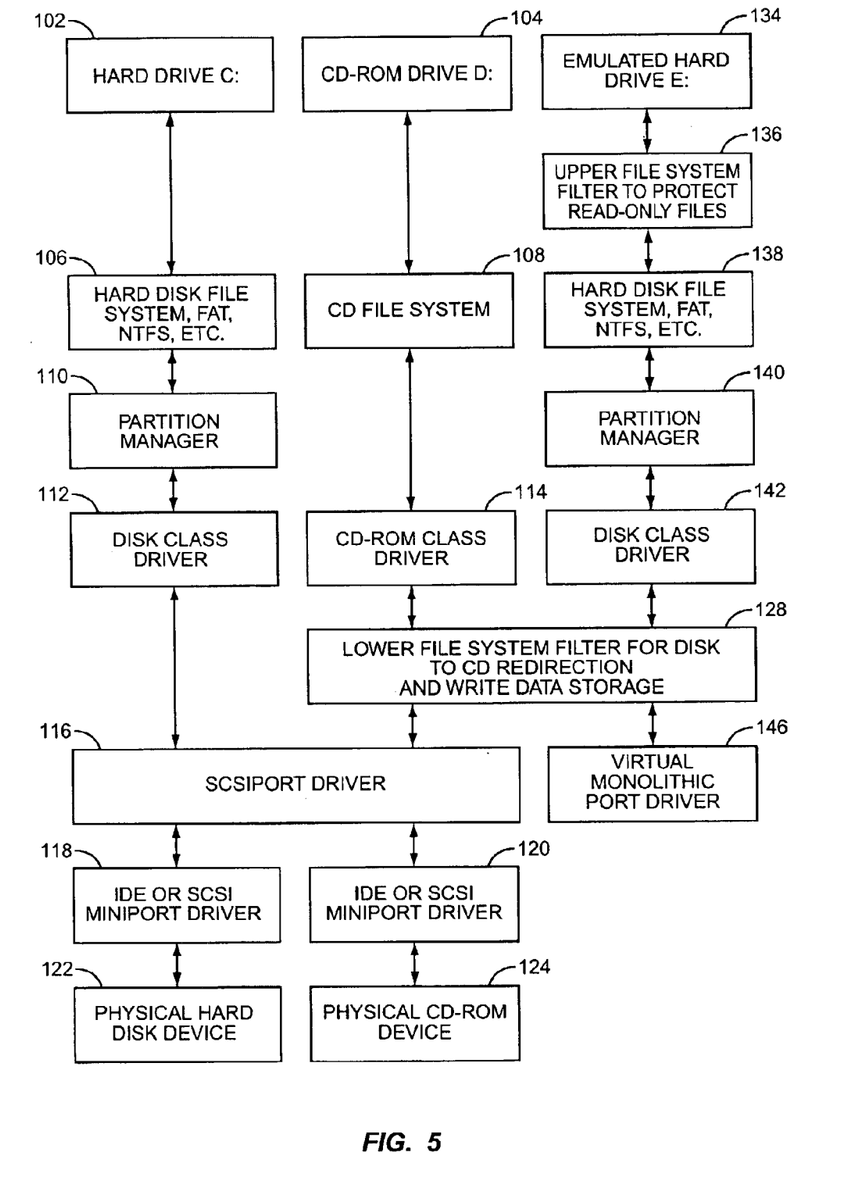
FIG. 5 is a diagram of a computer file system according to a different embodiment of an emulated read-write hard disk drive.

FIG. 5 depicts an alternative embodiment of the emulated read-write hard disk drive 125 of the present invention. In this embodiment, a virtual monolithic port driver 146 replaces both the SCSIport driver 116 (in the chain of the emulated read-write hard disk drive 125) and the virtual miniport driver 144. The virtual monolithic port driver 146 provides the functionality of both the SCSIport driver 116 and the virtual mini port driver 144.

Figure 6:
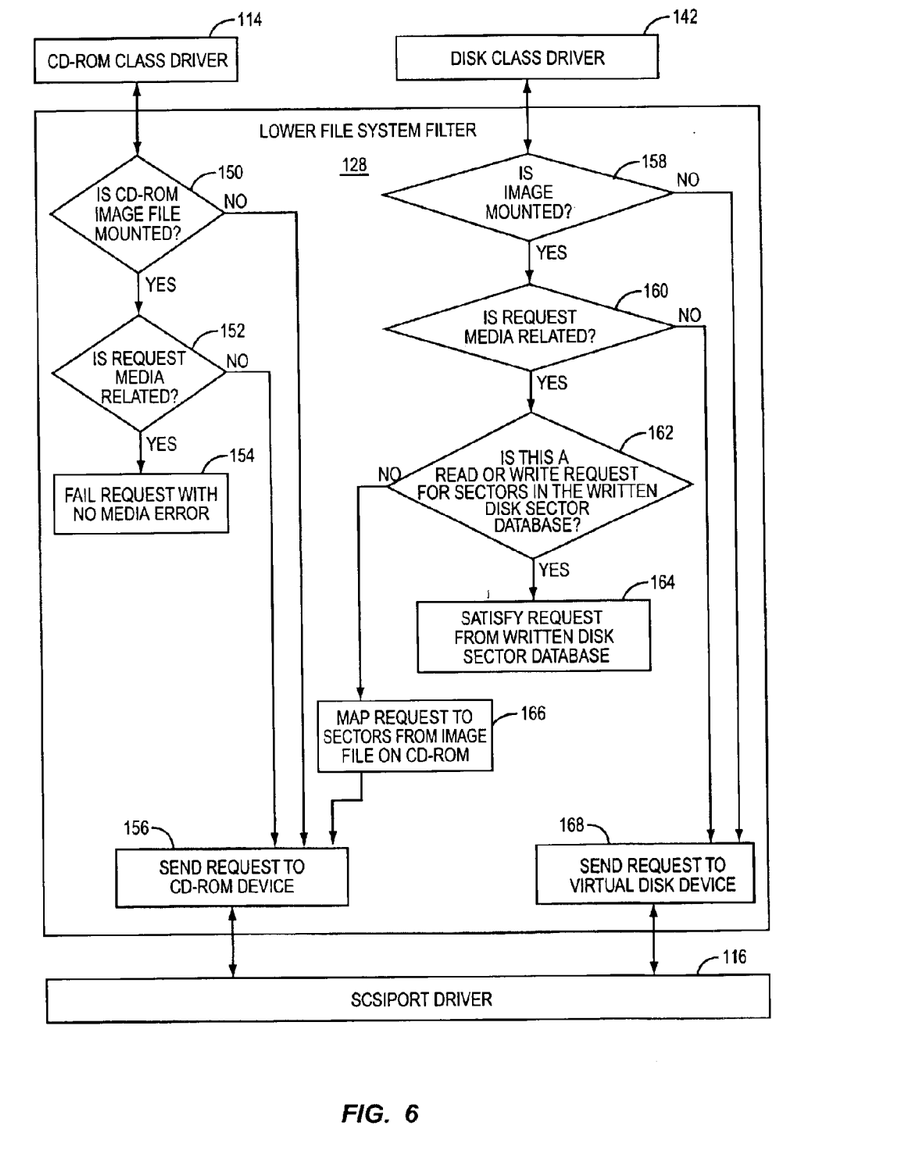
FIG. 6 is a flow diagram representation of a lower file system filter.

FIG. 6 demonstrates the operation of the lower file system filter 128 via a flow diagram. File I/O requests directed to the CD-ROM drive from the CD-ROM class driver 114 are intercepted by the lower file system filter 128. When a hard drive image file 130 is not being used to implement the emulated read-write hard disk drive 125, as determined at step 150, the file I/O requests are passed to the CD-ROM device at step 156. When the emulated read-write hard disk drive 125 is enabled, all I/O requests directed to the CD-ROM drive 124 are examined at step 152 to determine if the I/O request is media related. If so, the request is failed with a "no media" error code at step 154. If the I/O request is not media related, it is passed on to the CD-ROM drive 124 at step 156.

The lower file system filter 128 additionally intercepts requests directed to the emulated read-write disk drive 125, as they flow from the disk class driver 142. Whether hard drive emulation is enabled is determined at step 158, and if not, all I/O requests are directed to the lower disk driver layers at step 168. These I/O requests will eventually be processed by the virtual miniport driver 144, or the virtual monolithic port driver 146. If the emulated read-write hard disk drive 125 is enabled, the I/O request is then examined at step 160 to determine whether it is media related. If the I/O request is not media related, it is passed to the lower disk driver layers at step 168. If the I/O request is media related, it is then examined to determine whether it can be serviced from the written disk sector database 132. That is, a determination is made whether the I/O request is a write operation, or a read operation directed to data that has previously been written. If so, the I/O request is satisfied from the written disk sector database 132 at step 164. If not, that is, if the I/O request is an initial read request (i.e., a read request directed to data that has not been previously written), then the read request is mapped to appropriate sector(s) of the hard disk image file 130 at step 166, and the read request is sent to the CD-ROM device at step 156.

Figure 7:
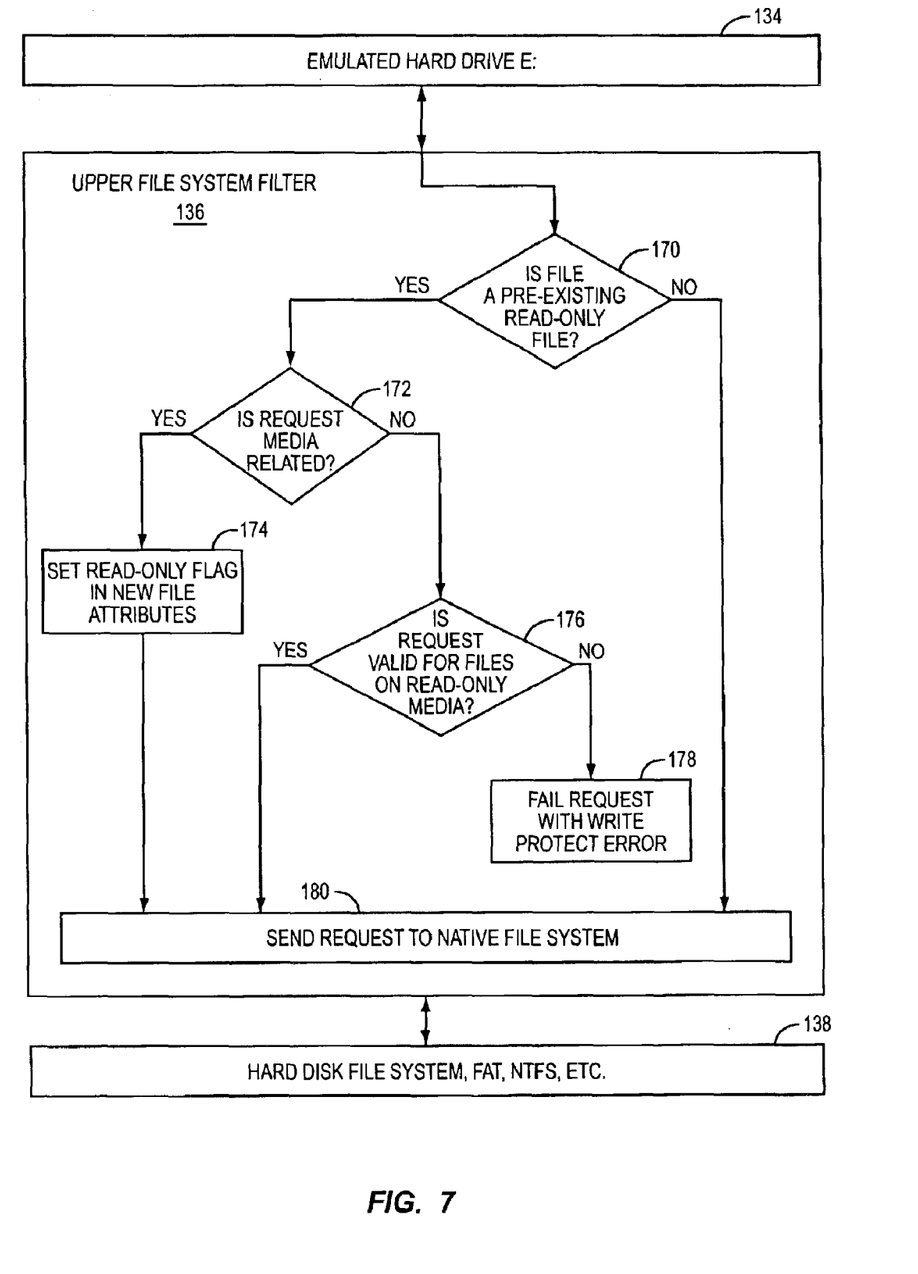
FIG. 7 is a flow diagram representation of an upper file system filter.

FIG. 7 depicts the operation of the upper file system filter 136 via a flow diagram. The upper file system filter 136 enforces file attributes of pre-existing files on the emulated read-write hard disk drive 125 by intercepting I/O requests directed to the emulated drive 125 by the operating system interface 134. The upper file system filter 136 first examines the I/O request to determine if it is for one of the pre-existing files on the emulated drive 125 (i.e., if the file exists on the hard disk image file 130), and if the file needs to be protected, at step 170. Whether the requested file needs to be protected may be determined at step 170 in a variety of ways, such as:

using a pre-created list of fully qualified file names;
using the file attributes;
using the file date/time stamp;
using the file location within the directory hierarchy; or
any combination of these methods.

If the intercepted I/O request is directed to a file that is not identified as a protected file, the request is passed on to the lower level file system drivers at step 180. If the I/O request is directed to a file identified as one in need of protection, then the request is further examined at step 172 to determine if it is a request to change the access attributes of the file. If the request would alter the read-only attribute for the protected file, then the request packet is altered at step 174 to force the read-only attribute to ON in order to preserve the read-only property associated with the file. The altered I/O request is then sent to the lower file system drivers at step 180. If a determination is made at step 172 that the I/O request will not alter the access attributes of the protected file, then the request is further examined at step 176 to determine if the request is valid for files on a read-only media. If the request is valid, it is sent on to the lower level file system drivers at step 180. If the I/O request is determined to be not valid for a file on a read-only media (e.g., a request to delete the file), then the request is failed at step 178 with an error code signaling an attempt to write to a write-protected media.

Figure 8:
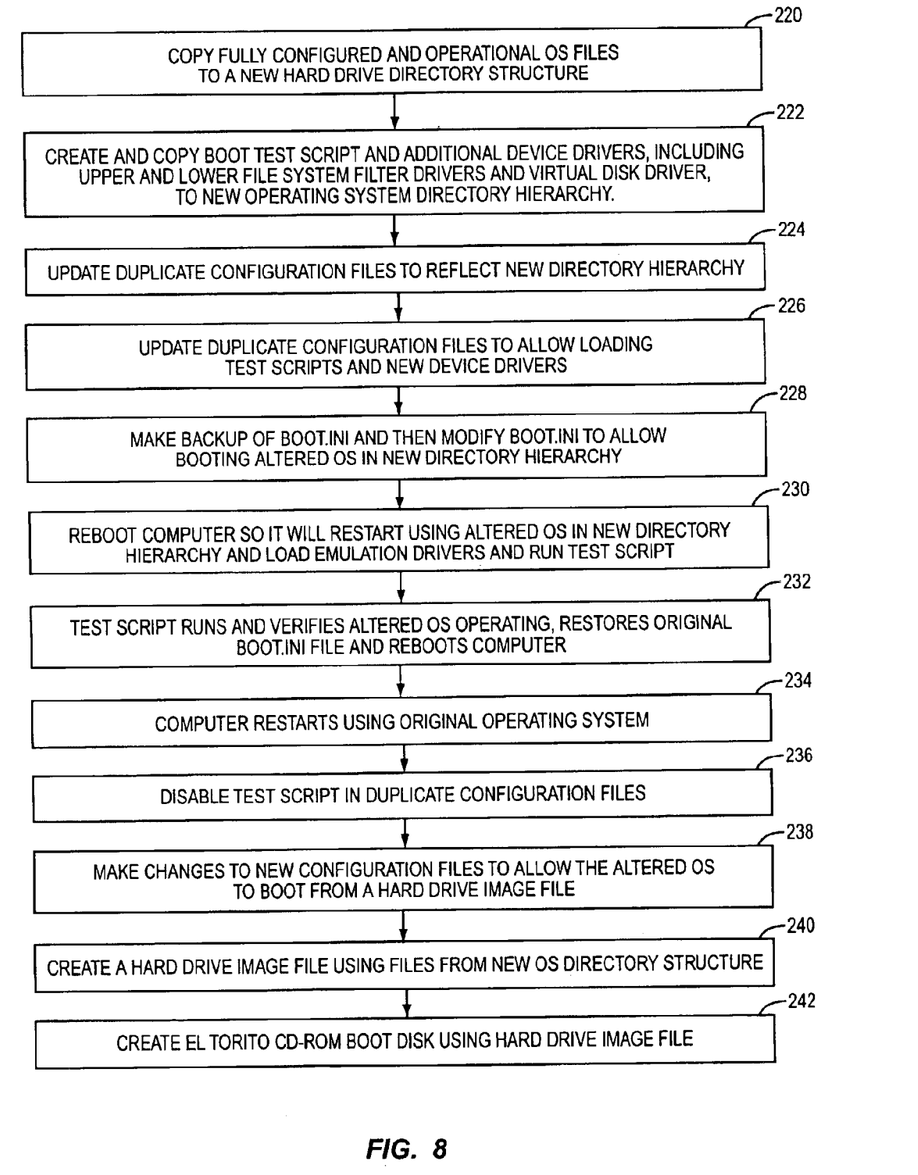
FIG. 8 is a flow diagram of creating a protected media from which a computer may boot and run.

FIG. 8 depicts a method of altering a modern OS 202 (such as, for example, Windows 2000 or Windows XP) to generate a bootable protected medium 200, from which the altered OS 126 of the present invention may boot and run (reference numbers refer to FIGS. 3 and 8). First a copy is made of the original OS 202 executable and configuration files by duplicating each of the original OS files in a new subdirectory hierarchy on the computer system hard drive 204 (step 220). For example; existing OS files located in "C:\Windows" or "C:\Program Files" may be copied to "C:\Rescue\Windows" and "C:\Rescue\Program Files" respectively. Test scripts for testing the boot-ability of the altered OS 126 files and device drivers 136, 128, 128, 144 used to support booting from a CD-ROM device are then copied to the new OS directory hierarchy (step 222). The operating system configuration files located in the new directory hierarchy are updated to reflect the new directory hierarchy where the duplicate files have been copied (step 224), and to cause the additional device drivers and test scripts to be loaded when booting the altered OS 126 (step 226). A backup copy of the BOOT.INI file on the boot device (such as drive C:) is created and the original BOOT.INI file is updated to allow the altered OS 126 in the new directory hierarchy to boot (step 228). The computer is rebooted so that it will restart and run from the altered OS 126 files in the new directory hierarchy (step 230). When the altered OS 126 starts it will run the test scripts to verify correct operation of the alternate OS 126 and hard drive emulation drivers 136, 128, 128, 144 (step 232). When testing is complete the test script will restore the original BOOT.INI file and reboot the computer to restore operation under the original OS 202 (step 234). The configuration files in the duplicated OS directory are then updated to remove or disable the test script (step 236). The configuration files in the duplicate OS directory are updated to enable booting the altered OS 126 from a hard drive image file (step 238). Next the duplicated OS directory hierarchy is used to create a hard drive image file (step 240). Finally, the hard drive image file is placed on a protected medium 200, such as an El Torito bootable CD-ROM disk (step 242). Note that, while the testing of the altered OS 126 is preferred, it is not essential to the present invention, and one of skill in the art will readily recognize that the benefits of the present invention may be obtained (albeit with reduced reliability) by omitting the test procedure.

Figure 9:
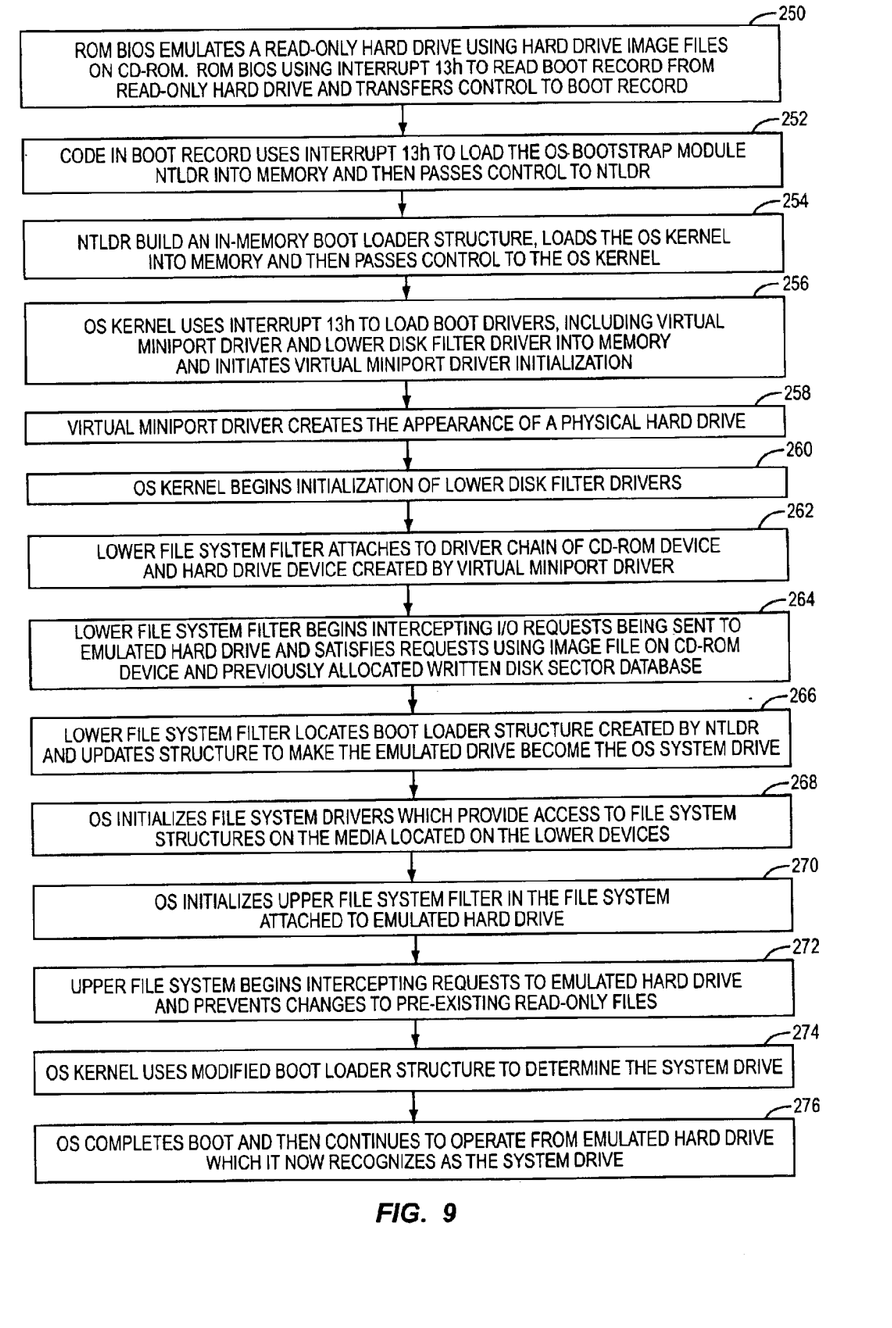
FIG. 9 is a flow diagram of a boot process from a protected medium according to the present invention.

FIG. 9 depicts a method by which the computer system may boot and run from a protected medium 200 using the altered OS 126 thereon, according to the present invention. The OS boot process begins (step 250) when the POST (Power On Self Test) routine in the ROMBIOS reads the boot sector on the protected medium 200, containing bootstrap code, into memory, and then transfers control of the CPU to the bootstrap code. The bootstrap code reads configuration information from the boot device (i.e., the protected medium 200). In particular, if the ROMBIOS supports the El Torito Specification it will identify the hard drive image file 130 located on the protected medium 200, and emulate a read-only hard drive (not shown) using the hard drive image file 130. The ROMBIOS provides access to the emulated read-only hard drive through the ROMBIOS interrupt 0x13 hard drive interface. The ROMBIOS will use the interrupt 0x13 hard drive interface to read the bootstrap code from the boot record on the emulated read-only hard drive, and transfer control of the CPU to the bootstrap code. Bootstrap code in the boot record will then use the interrupt 0x13 hard drive interface to load the altered OS 126 bootstrap module NTLDR into memory, and then pass CPU control to NTLDR (step 252). The bootstrap module NTLDR will then build an in-memory boot loader structure containing basic system configuration and boot drive information. Next NTLDR will load the kernel module from the emulated read-only hard drive using the ROMBIOS interrupt 0x13 hard drive interface, and pass CPU control and a pointer to the in-memory boot loader structure to the kernel module (step 254).

Normally, the kernel module would use the ROMBIOS interrupt 0x13 interface to load device and file system specific drivers in such a manner as to provide layers of support for the underlying file systems and storage devices as shown in FIG. 2. After the device drivers making up the layers had been loaded into memory, the kernel would no longer be able to access the emulated read-only hard drive using the ROMBIOS interface. According to the present invention, however, when booting the altered OS 126 from the protected medium 200, the kernel will also load the additional drivers 136, 128, 128, 144 to provide support for an emulated read-write hard drive 125 to be used as the system drive by the altered OS 126. After loading all of device driver layers into memory (step 256) the kernel will call the initialization routines for each of the loaded device drivers starting with the lowest level device drivers. During this initialization step the virtual SCSI miniport driver 144 (FIG. 3) or virtual monolithic port driver 146 (FIG. 4) reports finding a physical hard drive and then emulates the functionality of a physical hard drive to satisfy requests made by the altered OS 126 to the emulated read-write hard drive 125 (step 258). After initializing the lowest level drivers, the kernel will initialize the lower file system filter 128 (step 260). The lower file system filter 128 will attach itself to the driver chain of both the protected media drive 124 and the virtual port driver 144, 146 (step 260), and will allocate space in writeable Random Access Memory (or other writeable system resource) for the written disk sector database 132 and then begin to intercept I/O write and previously-written read requests going to the emulated read-write hard drive 125. These intercepted requests will be processed from the hard disk image file 130 on the protected medium 200, in combination with the written disk sector database 132, as described above (step 264). When the lower file system filter 128 initializes and is ready to start processing requests going to the emulated read-write hard drive 125, it will locate the boot loader structure created by NTLDR and update the information located in the structure (step 266) to make the emulated read-write hard drive 125 be the system drive. Next the OS kernel will initialize the file system driver layers and a file system driver will attach itself to the file system located on the emulated read-write hard drive (step 268). When all of the file system drivers have been initialized, the altered OS 126 kernel will initialize the file system filter drivers (step 270) including the upper file system filter 136 that protects pre-existing read-only files, as discussed above. When attached to the file system mounted on the emulated read-write hard drive 125, the upper file filter system filter 136 will begin processing file access requests so that pre-existing read-only files on the emulated read-write hard drive 125 will have the characteristics of files on a read-only media, while read-write files and free space on the emulated read-write hard drive 125 will have the characteristics associated with read-write media (step 272). Next the altered OS 126 kernel uses the boot loader information that was created in step 254, and modified in step 266, to locate the system drive (step 274). Finally, the kernel completes the boot process, and then continues run from the emulated read-write hard drive 125, operating as if it were running on a physical read-write hard drive device (step 276). The computer is then ready and available to the user, such as for disaster recovery operations, and is fully configured to the computer's specific hardware, accessories, network connections, and the like.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of creating a bootable hard drive image file, comprising
   copying files and configuration information from a fully configured and operational operating system to a hard drive image file;
   copying to said hard drive image file a written disk sector database driver operative to create and maintain a written disk sector database of a predetermined maximum size equal to the size of all read-write files and free space in said hard drive image file;
   copying to said hard drive image file a read-only protection driver operative to fail requests to write, delete or change file access attributes of read-only files; and
   altering said files and configuration information on said hard drive image file such that the operating system will load said written disk sector database driver and said read-only protection driver during booting.

2. The method of claim 1 further comprising:
   copying to said hard drive image file a file access request redirection driver operative to redirect write requests directed to read-write files or free space, and read requests directed to previously written files, to said written disk sector database, and
   wherein altering said files and configuration information includes directing the operating system to load said file access request redirection driver.

3. The method of claim 2 wherein said file access request redirection driver passes read requests directed to files not previously written, to said hard drive image file.

4. The method of claim 1 further comprising placing said hard drive image file on a protected medium.

5. A method of altering the operating system of a computer to boot and run from a protected medium, comprising:
   creating a hard drive image file;
   copying files and configuration information from a fully configured and operational operating system to said hard drive image file;
   copying a written disk sector database driver to said hard drive image file, said written disk sector database driver operative to create and maintain a written disk sector database of a predetermined maximum size equal to the size of all read-write files and free space in said hard drive image file;
   copying a read-only protection driver to said hard drive image file, said read-only protection driver operative to fail requests to write, delete, or change file access attributes of read-only files;
   altering said files and configuration information on said hard drive image file so that the operating system will load said written disk sector database driver and said read-only protection driver during booting, and
   placing said hard drive image file on a protected medium.

6. The method of claim 5 further comprising:
   copying a file access request redirection driver to said hard drive image file, said file access request redirection driver operative to redirect write requests directed to read-write files or free space, and read requests directed to previously written files, to said written disk sector database, and
   wherein altering said files and configuration information includes directing the operating system to load said file access request redirection driver.

7. The method of claim 6 wherein said file access request redirection driver passes read requests directed to files not previously written, to said hard drive image file.

8. The method of claim 5 further comprising copying user files and configuration information to said hard drive image file.

9. The method of claim 5 wherein said protected medium is read by a device recognized by the computer as a bootable device.

10. The method of claim 5 further comprising, prior to said hard drive image file on a protected medium, testing the altered operating system by:
    configuring said altered operating system to boot from a hard disk;
    re-booting said computer from said hard disk using said altered operating system; and
    executing at least one test script to test said altered operating system.

11. The method of claim 5 wherein said fully configured and operational operating system does not support running from a protected medium.

12. A protected computer readable medium including hard drive image file and an altered operating system created by altering a fully configured and operational operating system, said altered operating system operative to cause the computer to perform the following steps during booting:
    creating an emulated read-write hard disk drive and attaching said drive to the file system as a physical drive;
    creating and maintaining a written disk sector database of a predetermined maximum size equal to the size of all read-write files and free space on said emulated read-write hard disk drive, said written disk sector database operative to store write data directed to said emulated read-write hard disk drive; and
    installing a read-only protection file system filter operative to fail requests to write, delete, or change file access attributes of read-only files.

13. The protected medium of claim 12 wherein said altered operating system further causes the computer to perform the following step during booting:
    installing a redirection file system filter operative to redirect write requests directed to read-write files or free space, and read requests directed to previously written files, to said written disk sector database.

14. The protected medium of claim 13 wherein said altered operating system further causes the computer to perform the following steps during operation:
    redirecting write requests to said emulated read-write hard disk drive that are directed to read-write files or free space, and read requests that are directed to previously written files, to said written disk sector database;

redirecting read requests to said emulated read-write hard disk drive that are directed to files not previously written to said hard drive image file on said protected medium; and failing requests directed to said emulated read-write hard disk drive to write, delete, or change file access attributes of read-only files.

15. The protected medium of claim 12 wherein said altered operating system does not require a license separate from said fully configured and operational operating system.

16. The protected medium of claim 12 wherein said medium's contents are prepared and placed on said medium by an end user.

17. The protected medium of claim 12 further including configuration information specific to the user.

18. The protected medium of claim 17 wherein said specific configuration information is selected from the group including network access configuration information, passwords, cryptographic keys, digital signatures, program configuration settings, and file system backup schedules.

19. A method of computer disaster recovery, comprising:
prior to loss of use of a computer system drive, preparing a protected medium containing an altered operating system derived from a fully configured and operational operating system, and including at least one device driver to emulate a read-write hard disk drive; and following loss of use of said system drive, booting said computer from said protected medium and running said altered operating system on an emulated read-write hard disk drive comprising a written disk sector database of a predetermined size equal to all read-write files and free space on said emulated drive and a protection driver operative to fail requests to write, delete or change the read-only attributes of read-only files on said emulated drive.

20. The method of claim 19 wherein another said device driver comprises file access request redirection driver operative to redirect write requests directed to read-write files or free space, and read requests directed to previously written files, to said written disk sector database.

21. The method of claim 20 wherein said file access request redirection driver passes read requests directed to files not previously written, to said protected medium.

22. The method of claim 19 further comprising testing said altered operating system prior to placing it on said protected medium.

23. The method of claim 22 wherein said testing comprises rebooting said computer with said altered operating system and executing at least one test script, prior to placing said altered operating system on said protected medium.

24. The method of claim 19 wherein said fully configured and operational operating system does not natively run from said protected medium.

25. A method of booting and running a computer, whose primary operating system does not natively support running from protected media, from a protected medium, comprising:

copying said primary operating system files and configuration information to create a duplicate operating system;

creating file system filters and device drivers to emulate a read-write hard disk drive using a hard drive image file on a protected medium and a written disk sector database of a fixed maximum size equal to the size of all read-write files and free space on the emulated read-write hard disk drive;

altering said duplicate operating system to load and execute said file system filters and device drivers;

placing said altered operating system and said file system filters and device drivers on a protected medium; and booting and running said computer with said altered operating system from said protected medium.

26. The method of claim 25 wherein when running, said altered operating system runs on said emulated read-write hard disk drive.

27. The method of claim 26 wherein said emulated read-write hard disk drive operates by servicing initial read requests from said protected medium and servicing write requests and read requests to previously written data from said written disk sector database.

28. The method of claim 27 wherein said emulated read-write hard disk drive preserves the read-only characteristics of files on said protected medium by failing requests to write, delete, or alter the file access attributes of read-only files on said protected medium.

29. The method of claim 25 wherein booting and running said computer with said altered operating system from said protected medium does not require ROMBIOS interrupt 0×13 access following an initial operating system bootstrap phase.

\* \* \* \* \*